United States Patent [19]

Check, Jr.

[11] 4,310,720
[45] Jan. 12, 1982

[54] COMPUTER ACCESSING SYSTEM

[75] Inventor: Frank T. Check, Jr., Orange, Conn.

[73] Assignee: Pitney Bowes Inc., Stamford, Conn.

[21] Appl. No.: 892,252

[22] Filed: Mar. 31, 1978

[51] Int. Cl.³ ............................................. H04L 9/00
[52] U.S. Cl. ............................ 178/22.08; 178/22.09;
340/825.31; 235/382; 364/900
[58] Field of Search ... 364/200 MS File, 900 MS File;
178/22; 340/149 R, 149 A, 152 R; 235/382

[56] References Cited

U.S. PATENT DOCUMENTS

| | | | |
|---|---|---|---|
| 3,798,359 | 3/1974 | Feistel | 178/22 |
| 3,800,284 | 3/1974 | Zucker . | |
| 3,860,911 | 1/1975 | Hinman . | |
| 3,956,615 | 5/1976 | Anderson | 340/149 A |
| 3,958,081 | 5/1976 | Ehrsam | 364/200 |
| 3,996,449 | 12/1976 | Attanasio . | |
| 4,017,798 | 4/1977 | Gordy . | |
| 4,074,066 | 2/1978 | Ehrsam | 178/22 |
| 4,079,188 | 3/1978 | Kinch, Jr. | 178/22 |
| 4,123,747 | 10/1978 | Lancto | 178/22 |
| 4,133,973 | 1/1979 | Branscome | 178/22 |
| 4,145,568 | 3/1979 | Ehrat | 178/22 |

FOREIGN PATENT DOCUMENTS

| | | |
|---|---|---|
| 1351574 | 5/1974 | United Kingdom . |
| 1379740 | 1/1975 | United Kingdom . |
| 1383915 | 2/1975 | United Kingdom . |
| 1393920 | 5/1975 | United Kingdom . |
| 1399020 | 6/1975 | United Kingdom . |
| 1458495 | 12/1976 | United Kingdom . |
| 1484042 | 8/1977 | United Kingdom . |
| 1487089 | 9/1977 | United Kingdom . |

OTHER PUBLICATIONS

*Proceedings of the IEEE*, vol. 63, No. 11, Nov. 1975, "Some Cryptographic Techniques for Machine-to-Machine Data Communications", Feistel, Notz, and Smith, pp. 1545 to 1554.

*Primary Examiner*—James D. Thomas
*Attorney, Agent, or Firm*—David E. Pitchenik; William D. Soltow, Jr.; Albert W. Scribner

[57] ABSTRACT

A communications link between a computer and a remote user is effected by a portable access unit which generates a nonrecurring access code which is a function of a password and a pseudorandomly generated number. The access code is transmitted and compared with an access code generated by a computer access controller. In addition to the access code, the pseudorandomly generated number provides an encryption key which is not transmitted but corresponds to a mating encryption key generated at the controller. The mating encryption keys are utilized to set up data transmission enciphering/deciphering networks successive links are established by incremented pseudorandomly generated access codes.

20 Claims, 3 Drawing Figures

COMPUTER ACCESSING SYSTEM

BACKGROUND OF THE INVENTION

1. Summary of the Invention

This invention relates generally to securing communication links between a computer and a remote terminal and more particularly to a system for accessing a computer and keying an encryption network for data transmission through pseudorandom number generation.

Society's multifaceted dependency upon computer systems has increased the possible effects of unauthorized computer access to untold levels. Computer networking, such as time sharing systems, has led to inherent security problems, since programs executed by such systems shared access and cooperated with each other. The capabilities of recent computer systems included not only the utilization of remote terminals but extensive resource sharing and batch processing of different projects. The use of such systems has necessarily increased the likelihood of deliberate or even accidental acquisition and/or alteration of data.

Computer systems have been subject to a variety of security risks ranging from misappropriation of confidential data through unauthorized use of computing time. Access controls have been used in virtually all time sharing and most other computer systems. Differences in the nature of the information being processed have given rise to various security measures and procedures commensurate with the value attached to such data and the consequences of unauthorized access and/or appropriation thereof. For example, the data processed in computer systems utilized for financial transactions has a substantial value due to the monetary losses which could be sustained as a result of system penetration.

A user has been traditionally identified by at least one of the following:
 (a) through something he knew or had memorized, e.g. a password;
 (b) through something he carried wih him, e.g. a card or badge; or
 (c) through a personal physical characteristic, e.g. recognition by a guard.

Passwords have been widely employed to authenticate a remote terminal user. The use of passwords has been augmented by secondary security measures in many instances. For example, a typical consumer banking terminal accesses its computer by using a combination of a magnetically encoded card and the user's memorized password commonly referred to as a personal identification number.

While such systems might have been satisfactory from a cost/loss risk standpoint, they were subject to penetration with or without access to the individual user's card. Various password selection procedures and their susceptibility to penetration have been discussed in a U.S. Department of Commerce publication entitled *The Use of Passwords for Controlled Access to Computer Resources*, NBS Special Publication 500-9 dated May 1977.

In addition to penetration of the user's password, passwords themselves were ineffective, for example, against the penetration threat of between-lines entry and piggy-back infiltration. Unauthorized interception of communication links between the computer and a remote user has been a further security problem and resulted in obtaining not only the data transmitted but the user's password for subsequent access.

SUMMARY OF THE INVENTION

A remote computer is accessed by a nonrecurring access code generated as a function of a pseudorandom number and a user password. The access code is transmitted over telephone lines through the use of a digital signal to audio tone modem and decoded at the computer location. An access controller receives the decoded access code and compares it to an expected access code which has been congruently generated. Upon recognition of an equality between the controller generated access code and the transmitted access code, the controller grants access to the computer. The generated pseudorandom number can be divided into two segments, one of which is used to furnish the access code and the other an encryption key utilized for subsequent data transmission between the user and the computer or, in the alternative, two pseudorandom numbers are generated, one of which is utilized for access code generation and the other for the encryption key.

From the above compendium it will be appreciated that it is an object of the present invention to provide a remote accessing system of the general character described for establishing a communications link between a computer and a remote user which is not subject to the disadvantages aforementioned.

A further object of the present invention is to provide a remote accessing system of the general character described for establishing a communications link between a computer and a user employing an accessing password which is not transmitted over communications lines.

A further object of the present invention is to provide a remote accessing system of the general character described for establishing a communications link between a computer and a user which utilizes pseudorandom number generation to provide nonrecurring access codes.

Another object of the present invention is to provide a remote accessing system of the general character described for establishing communication links between a computer and a user which employs data encryption established in conjunction with a nonrecurring encryption key.

A further object of the present invention is to provide a remote accessing system of the general character described for establishing communications links between a computer and a user which utilizes pseudorandom number generation for the purpose of both accessing the computer and providing a data encryption key.

Another object of the present invention is to provide a remote accessing system of the general character described for establishing communications links between a computer and a user wherein interception of user-computer communications will not provide sufficient data for independently accessing the computer.

Other objects of the invention in part will be obvious and in part will be pointed out hereinafter.

With these ends in view the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

FIG. 3 is a flow diagram illustrating a continuation of the controller routine originating in FIG. 2.

DESCRIPTION OF THE PREFERRED EMBODIMENT

Figure 1:
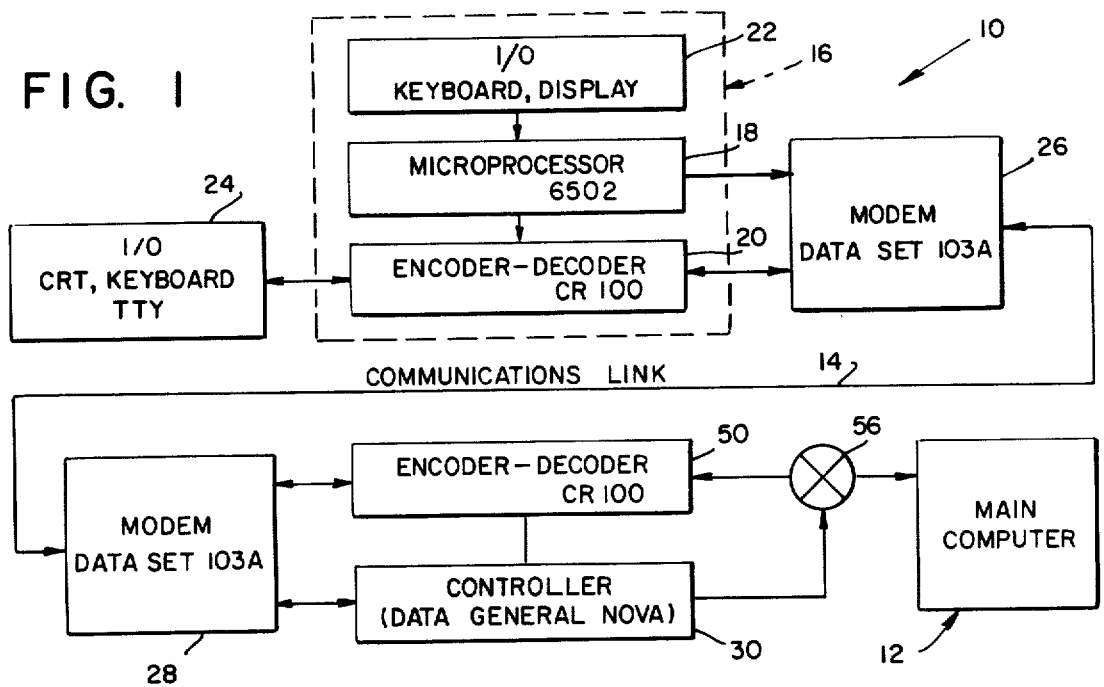
FIG. 1 is a schematized block diagram of a remote accessing system constructed in accordance with and embodying the invention and illustrating an access unit at a remote terminal establishing a communications link to a main computer.

Referring now in detail to the drawings, and specifically to FIG. 1 wherein a block diagram illustrating a typical communications channel linking a remote user with a computer is shown, the reference numeral 10 denotes generally a remote terminal from which a user communicates with a computer 12. In accordance with the present invention, a communications link 14 is established through the use of conventional data transmission facilities such as, for example, a telephone line or The present invention prevents unauthorized access to the computer 12 through the use of a user assigned password which functions only in conjunction with a user assigned access unit 16. The access unit 16 is preferably lightweight and hand-carried and typically includes a microprocessor 18 such as MOS Technology 6502 programmed to generate a series of pseudorandom numbers in a reproducible fashion from an initial grouping of seed numbers.

The access unit 16 further includes a data encoder 20 for the purpose of encrypting data for transmission over the link 14 to render intercepted data communications unintelligible. The encoder 20 may comprise data encryption hardware compatible with the Data Encryptin Standard algorithm promulgated by the National Bureau of Standards. Among the devices presently available for data encryption utilizing the Data Encryption Standard algorithm are the Rockwell-Collins CR-100 Network Encryptor, the Hansco Data Processing-Federal 007 and the Motorola "InfoGuard" system. Use of the Data Encryption Standard algorithm is by way of example only, and any other encryption algorithms and encryptors such as the Datotek DH-26 security device can be employed.

In addition to the microprocessor 18 and the encoder 20, the access unit also includes an input/output device 22, typically comprising a keyboard and a transient display for indicating keyboard entries which, as will be described herein, comprise the user assigned password.

Preferably, an authorized user carries his access unit 16 to the remote terminal 10 and interconnects the access unit with remote terminal computer peripherals such as an input/output device 24 which may comprise a keyboard and/or CRT or TTY. Communication from the input/output device 24 to the computer 12 is first encrypted by the encoder 20 and then encoded into audiotones at a tone encoder/decoder modem 26 which may comprise, by way of example, a Bell System 103A Data Set. The tone encoded data is transmitted to the computer 12 via the communications link 14.

Pursuant to the invention, the microprocessor 18 is actuated to generate a chain of nonrecurring numbers from a group of seed numbers originally implanted. A typical processor sub-routine for repeatable pseudorandom number generation is disclosed in U.S. Pat. No. 3,792,446 issued Feb. 12, 1974 to McFiggins et al and assigned to the assignee of the present invention. It should be understood that such pseudorandom number generation sub-routine is exemplary of manifold random number generation algorithms which may be employed.

User password integrity is maintained in accordance with the present invention by not directly transmitting the password over the communications link 14. Further, pursuant to the instant invention, possession of the password without the access unit will not permit access to the computer, nor will possession of the access unit without the user's assigned password.

Generation of an acceptable access code signal by the access unit 16 entails the generation of a predicted pseudorandom number by the microprocessor 18 and modification of the pseudorandom number as a function of the password which is entered on the keyboard (input-/output device 22). For example, the access code may comprise pseudorandomly generated numbers multiplied by the user's password which also comprises a number. The access code thus generated is fed to the modem 26 along with a constant access unit preface number for transmission via the communications link 14 to the computer 12. Interception of the access code transmission will not reveal the user's password but only the access unit preface number and the access code for the intercepted communication. As will be later described, such access code is not valid for subsequent communication links and cannot form the basis for deriving subsequent valid codes.

The tone encoded transmissions through the communications link 14 are received at a companion modem 28 for conversion to digital waveforms. Access to the main computer 12 is controlled by a controller unit 30 which monitors the communications link 14. The controller may comprise a minicomputer such as the Data General NOVA series or even a microprocessor such as the microprocessor used in conjunction with random number generation at the access unit.

It should be appreciated that the controller 30 is programmed with a congruent random number generation algorithm and initial seed numbers compatible with those assigned to all authorized access units. Further, the controller 30 may be set up such that the initial access code generated by each authorized access unit and its associated assigned password is stored in a self-contained memory for ready reference.

Figure 2:
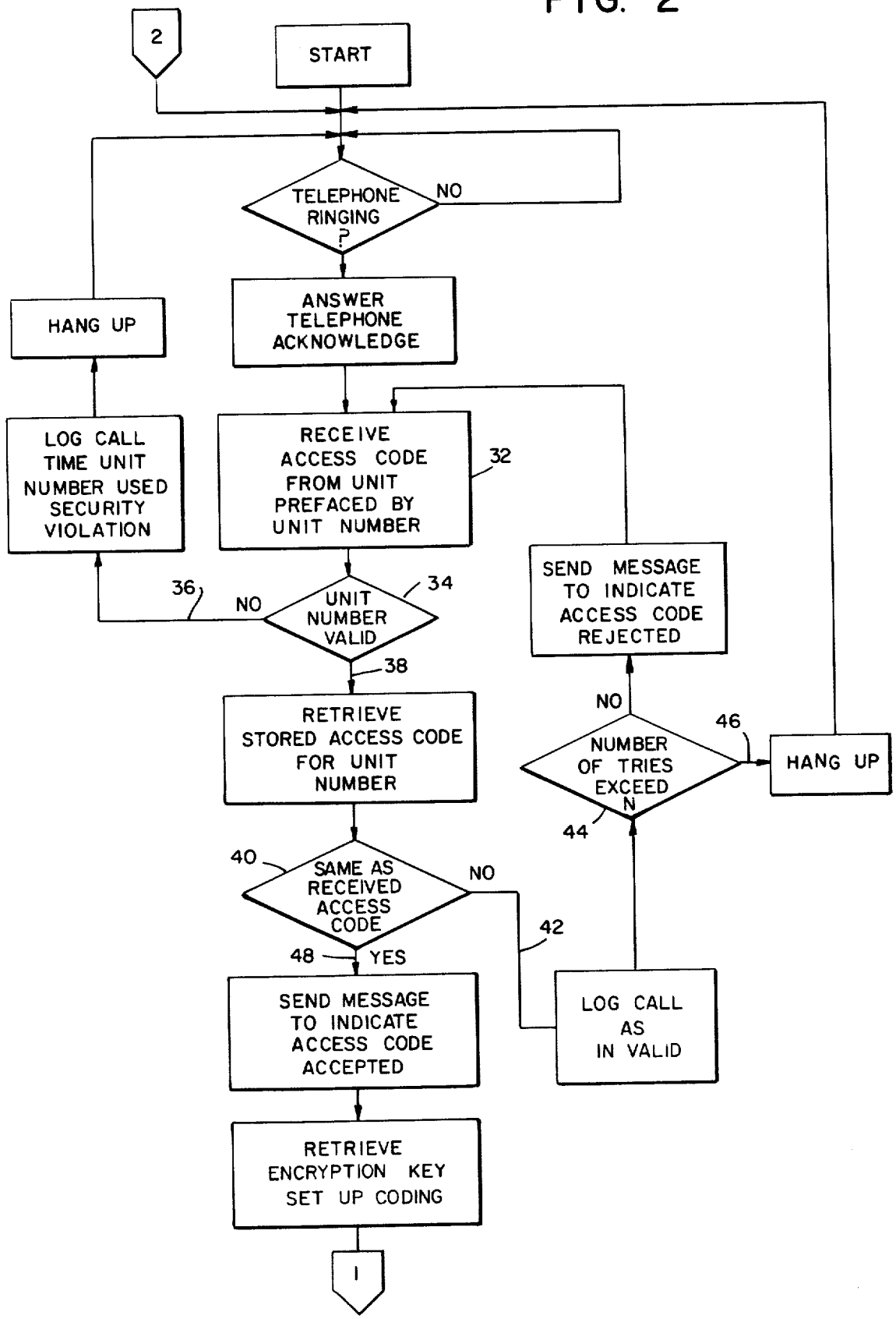
FIG. 2 is a flow diagram illustrating an access controller routine for establishing access to the computer.

Referring now to the flow diagram of FIGS. 2 and 3 where the accessing sub-routine of the controller unit 30 is depicted, it will be appreciated that after answering an incoming telephone signal, the controller receives, through the modem 28, the unit preface number followed by the transmitted access code as shown at an input block 32.

As shown in a decision block 34, inquiry is made for verification of the incoming access unit preface number with access unit preface numbers stored in the controller memory to determine whether the attempt to gain computer access is being made through the use of a validly assigned access unit 16 which has not been reported to be in the possession of anyone other than its authorized user. If the access unit preface number is not valid or if the preface number has been generated by a unit reported as stolen or missing, the program exits the decision block 34 on a branch 36 and the controller 30 logs the security violation and terminates the telephone link 14.

Upon acknowledgment of an incoming signal from a valid access unit, the program exits the decision block 34 on a branch 38 and the controller retrieves the expected access code to be received from such access unit from a memory and compares the expected access code with the code received over the communications link as depicted in a further decision block 40.

In order to prevent access code discrepancies due to signal interference from terminating a valid access attempt, the controller 30 will permit a valid access unit to transmit its access code a predetermined number of times. If the transmitted access code does not match the access code assigned to that unit number and stored in the controller memory, the program exits on a branch 42, the access code attempt is logged and the controller determines how many attempts have been made to transmit the access code as shown in a decision block 44. If there have been less than the allotted number of attempts, a message is returned to indicate that the transmitted access code has been rejected and is to be retransmitted and the program reverts to the input block 32. After the allotted number of attempts has been reached, the program exits the decision block 44 on a branch 46 to break the communications link 14.

Upon receiving a transmitted access code which coincides with the stored access code anticipated, the program exits the decision block 40 on a branch 48 and the controller 30 thereafter sends a message to the access unit microprocessor 18 indicating acceptance of the access code such that the microprocessor will generate the next sequential pseudorandom number upon subsequent actuation rather than repeat its last pseudorandom number.

The controller 30 then searches its nonvolatile memory and retrieves a stored encryption key for the assigned access unit 16. The encryption key can comprise either a segment of a single random number generation or a separate random number as generated by both the access unit microprocessor 18 and the controller 30. The encryption key retrieved by the controller 30 is used to key an encoder/decoder 50 associated with the controller. It should be appreciated that the encryption key is not transmitted over the communications link 14 and is independently generated at both the access unit 16 and the controller 30 on opposite ends of the link 14. Thus, anyone intercepting and recording the data transmission over the link 14 will not obtain the encryption key used to set up the enciphering/deciphering network.

As shown in a block 52 of FIG. 3, the controller 30 thereafter generates the next expected access code for the access unit 16 through the pseudorandom number generation algorithm with seed numbers which have been generated, e.g. as described in U.S. Pat. No. 3,792,446, and modifies the pseudorandom number by the password. Additionally generated is the successive encryption key which may comprise a segment of the random number. The controller 30 thereafter replaces the previous access code and encryption keys for the access unit 16 in its nonvolatile memory.

The program thereafter exits the block 52 and advises the computer 12 of the access unit preface number, as shown in a block 54, and connects a data path from the remote terminal 10 to the computer 12 through the encoder 50 and a computer access switch 56.

At the termination of the communication between the input/output device 24 at the terminal 10 and the computer 12, the controller logs the communication with reference to the access unit preface number, the time and the data and thereafter disconnects the communications link 14.

It should be appreciated that the controller 30 may readily be adapted to simultaneously control a plurality of communication links 14 established by various access units. Further, in lieu of generating the access code and encryption key in advance, the controller may generate these numbers during accessing procedure. Similarly, the access unit microprocessor 18 may generate its pseudorandom number upon each actuation or generate the numbers once and store them in a memory for recall when an access code is to be generated.

The access unit 16, upon actuation, will generate its next sequential pseudorandom number modified by whatever password is attempted. If the user is not authorized, he will not know that the access code generated will not grant access unless an attempt is made to gain access. Such attempts are logged by the controller 30, and security personnel will be alerted upon the occurrence of any unusual pattern of access attempts by any given access unit as identified by its preface number.

Thus, it will be seen that there is provided a computer accessing system which achieves the various objects of the invention and is well suited to meet the conditions of practical usage.

Having thus described the invention, there is claimed as new and desired to be secured by Letters Patent:

1. A system for accessing a computer by a user having an assigned password to establish a communications link for data transmission between a computer terminal and a computer, the system comprising access means at the terminal for sequentially generating a pseudorandom number of a first sequence of pseudorandom numbers, means receiving said pseudorandom number and said user assigned password and in response thereto modifying the pseudorandom number as a predetermined function of the password to provide an access code signal unique to itself, means transmitting the access code signal and identification signal from the terminal, controller means at said computer, the controller means receiving the transmitted access code signal and identification signal, the controller means including means responsive to the identification signal for sequentially generating a pseudorandom number of a second sequence of pseudorandom numbers congruent with the numbers of the first sequence and generating a signal corresponding to said user assigned password, and means for modifying said pseudorandom number of the second sequence with said last mentioned signal to provide a congruent access code signal and in response to the equality of the congruent access code signal and transmitted access code signal providing an access signal, and means receiving the access signal and in response thereto establishing a data transmission path between the terminal and the computer, said first and second sequences being the same, whereby computer access is secured through a sequential change of access codes in a pseudorandom fashion without direct transmission of said user's password.

2. A system for accessing a computer to establish a communications link for data transmission constructed in accordance with claim 1 wherein the computer terminal is positioned remote from the computer.

3. A system for accessing a computer to establish a communications link for data transmission from a remote terminal as constructed in accordance with claim 2 wherein the means transmitting the access code comprises a telephone communications link.

4. A system for accessing a computer to establish a communications link for data transmission constructed in accordance with claim 1 wherein the means generating the pseudorandom number comprises a portable unit.

5. A system for accessing a computer to establish a communications link for data transmission constructed in accordance with claim 1 wherein a plurality of said access means are provided for use with at least one said terminal, said plurality of access means having different pseudorandom number sequences and different identification signals, the controller means further including a plurality of means generating pseudorandom number sequences according to said plurality of access means, in a reproducible fashion.

6. A system for accessing a computer to establish communication links for data transmission constructed in accordance with claim 1 wherein the means generating the first pseudorandom number sequence comprises an access unit, the access unit further including first encryption means adapted to establish an enciphering-/deciphering network in response to an encryption key signal produced therein, the controller means including second encryption means adapted to encipher and decipher signals in accordance with said key as produced in said controller, the pair of encryption means being adapted to encrypt data transmission between the terminal and the computer.

7. A system for securing a communications link for data transmission constructed in accordance with claim 6 wherein the access unit includes means adapted to separate the pseudorandom number of the first sequence into segments, one of the segments comprising an encryption key signal, the controller means including means to separate the pseudorandom number of the second sequence into segments, a congruent segment comprising the encryption key for the second encryption means, whereby data transmission is secured through a sequential change of encryption keys in a pseudorandom fashion without direct transmission of the encryption keys.

8. A system for securing a communications link for data transmission constructed in accordance with claim 6 wherein the means adapted to generate the pseudorandom number of the first sequence is adapted to generate a pair of psuedorandom numbers, one of which is modified by the password and the other of which comprises the encryption key signal, the means for sequentially generating pseudorandom numbers of the second sequence being adapted to generate a pair of second pseudorandom numbers one of which is modified by the signal corresponding to the user assigned password to provide the congruent access code signal and the other of which comprises the encryption key signal for the controller, whereby data transmission is secured through a sequential change of encryption keys in a pseudorandom fashion without direct transmission of the encryption keys.

9. A method of accessing a computer at one location by a user positioned at a second location and having an assigned password, the method comprising the steps of
(a) sequentially generating a nonrecurring pseudorandom number of a first sequence at the second location,
(b) modifying the pseudorandom number as a function of the user assigned password to provide an access code,
(c) transmitting the access code and an identifying signal unique to the second location from the second location to the first location,
(d) receiving the transmitted access code and identifying signal at the first location,
(e) in response to the identifying signal, sequentially generating a pseudorandom number of a second sequence congruent with said first sequence, at the first location, and also generating, in response to the identifying signal, a signal corresponding to the user assigned password,
(f) modifying the pseudornandom number of the second sequence with said last mentioned signal corresponding to the user assigned password to provide a congruent access code,
(g) comparing the received access code with the congruent access code, and
(h) granting access to the computer upon recognition of an equality between the received access code and the congruent access code,
whereby computer access is secured through a change of access codes in a pseudorandom fashion without direct transmission of the user's password.

10. A method of accessing a computer as set forth in claim 8 wherein the next sequential congruent access code is generated prior to receipt of the next transmitted access code; the method further including the steps of storing the next congruent access code and recalling said next congruent access code upon receipt of the next transmitted access code.

11. A method of accessing a computer as set forth in claim 9 wherein the pseudorandom number of the first sequence generated at the second location comprises two segments, one of which is used to generate the access code, the method further including the step of keying an encryptor at the second location with a further segment of the pseudorandom number, the pseudorandom number of the second sequence comprising two segments, one of which is used to generate the congruent access code, the method further including the step of keying a congruent encryptor at the first location with a further segment of the congruent pseudorandom number, whereby data transmission is secured through sequential change of encryption keys in a pseudorandom fashion without transmission of the encryption key from one location to the other.

12. The method of claim 9 in which the second location comprises a terminal and a portable access unit, said terminal being coupled to said computer at said first location, said method further comprising inserting said access unit in the coupling between said terminal and computer at said second location, before said step of sequentially generating a nonrecurring pseudorandom number at said second location, whereby data passing through said coupling must pass through said access unit, said steps of sequentially generating a nonrecurring pseudorandom number at said second location, modifying said pseudorandom number as a function of the user assigned password in said second location, and transmitting said access code and identifying signal from said second location are effected in said access unit.

13. The method of claim 12 wherein said access unit further comprises encryption means, said method further comprising the step of encrypting all messages from said terminal in said encrypting means.

14. A system for accessing a computer by a user having an assigned password to establish a communication link for data transmission between a computer terminal and a computer via a data transmission path, said system comprising a portable access unit connected as a peripheral to said terminal and comprising:
   (a) means sequentially generating nonrecurring pseudorandom numbers in a reproducible fashion, and
   (b) means modifying said pseudorandom numbers as a predetermined function of said password to provide a first access code, and means applying said access code and a unique identifying signal to said data transmission path prior to data from said computer terminal; said system further comprising, at said computer;
   (c) means for sequentially generating pseudorandom numbers congruent with those generated by said access unit in response to the reception of said identifying signal,
   (d) means responsive to said identifying signal for generating a signal corresponding to said user assigned password and for modifying said congruent pseudorandom numbers with said last mentioned signal to provide a second access code,
   (e) means for receiving said first access code and comparing it with said second access code and in response to the equality thereof providing an access signal,
   (f) means receiving the access signal and in response thereto establishing a data transmission path between the terminal and the computer, whereby computer access is secured through a sequential change of access codes in a pseudorandom fashion without direct transmission of the user's password.

15. The system of claim 14, wherein said terminal comprises a I/O unit for providing data signals, and said access unit is connected to said I/O unit.

16. The system of claim 15, wherein said access unit includes keyboard means for entering said password.

17. The system of claim 15, wherein said access unit further comprises means for generating a constant access unit code signal individual to said access unit, and transmitting said constant signal prior to said access code as said identifying signal.

18. The system of claim 15, wherein said access unit comprises means for encrypting data from said I/O unit prior to application to said data transmission path.

19. In a system comprising a computer coupled to a plurality of terminals, the improvement comprising a plurality of portable access units each adapted to be inserted at one of said terminals between the respective terminal and said computer, each said access unit comprising a pseudorandom number generator for sequentially generating a separate pseudorandom sequence, a source of an identifying signal unique to the respective unit, means for receiving a password from a user, means modifying the pseudorandom numbers of the respective sequence by said passwords, means transmitting to the computer the identifying signal and the access code, and means passing data between the terminal and computer, said system further comprising a controller at said computer, said controller comprising means for receiving the identifying signals from the access unit, and, in response thereto, sequentially generating a pseudorandom number congruent with the sequence of the given access unit and also generating a signal corresponding to the password of the respective access unit, to provide an access code signal generated therein, means for modifying the pseudorandom number generated in said controller by said access code signal generated therein to produce a congruent access code, and means responsive to equality of the congruent access code and first mentioned access code for enabling access of the respective terminal to said computer.

20. The system of claim 19 wherein said access unit comprises encrypting means for encrypting data from the respective terminal for transmission to said computer.

* * * * *